E. A. DOTY.
NUT LOCK.
APPLICATION FILED JAN. 19, 1912.
1,039,710.
Patented Oct. 1, 1912.
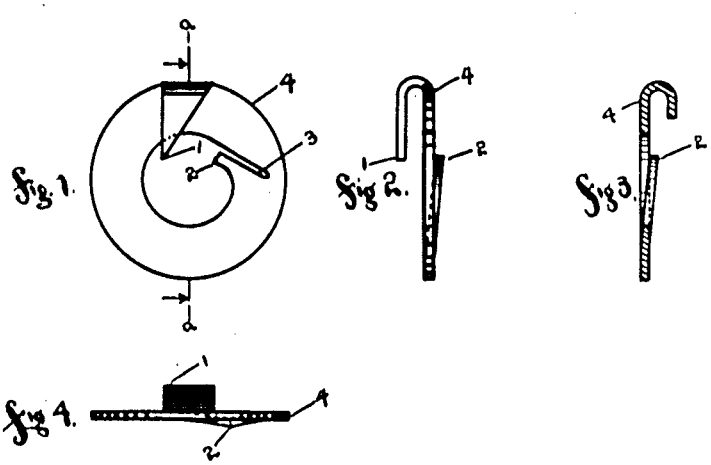
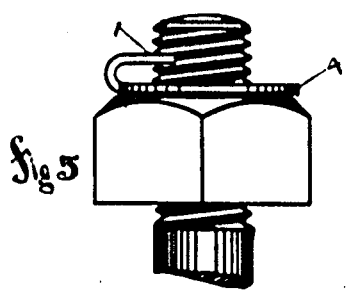
Witnesses,
Frederick E. Dew
Rita Van Der Volgen
Inventor.
Edwin A. Doty
by
Walter E. Ward
atty.

UNITED STATES PATENT OFFICE.

EDWIN A. DOTY, OF ALBANY, NEW YORK.

NUT-LOCK.

1,039,710. Specification of Letters Patent. Patented Oct. 1, 1912.

Application filed January 19, 1912. Serial No. 672,217.

*To all whom it may concern:*

Be it known that I, EDWIN A. DOTY, a citizen of the United States, residing at Albany, in the county of Albany and State of New York, have invented certain new and useful Improvements in Nut-Locks, of which the following is a specification.

My invention relates to nut-locks and the object of my invention is to construct a one-piece nut-lock made to comply with threads of the bolt and engage in the metal bolt itself between the threads, so as not to injure the threads of the bolt, and so constructed that the nut-lock may contain one or more points to impinge into the metal bolt between the threads and bind upon the bottom and sides of the threads in such a manner as to prevent said nut-lock from turning backward. I obtain this object by means of the nut-lock constructed as shown in the accompanying drawings in which—

Figure 1 is a top plan view of my nut-lock. Fig. 2 is a vertical side elevation. Fig. 3 is a section on line *a, a*, Fig. 1. Fig. 4 is a horizontal side elevation. Fig. 5 is a perspective view of a bolt and my nut-lock locking a nut thereon.

Similar numerals refer to similar parts throughout the several views.

On September 4, 1906, Letters Patent of the United States No. 830,055, were issued to me for nut-lock and on October 29, 1907, Letters Patent of the United States No. 869,696, were issued to me for nut-lock which was an improvement upon my former invention.

My present invention is an improvement on the nut-lock shown and described in the last named patent.

This improvement consists principally in making the nut-lock without any screw threads as provided in my former patents but having one or more cuts or slots stamped therein and at the same time stamping the inner edge of the circumference of the bolt hole somewhat in a spiral form, thereby shaping it in the form of a thread, to follow the thread of the bolt in screwing the nut-lock on the bolt. The same operation also stamps out a folding point arranged to impinge the body of the bolt itself between the screw threads so as not to interfere with or injure the screw threads but to leave the screw threads perfectly smooth after the nut-lock is removed.

Referring to the drawings, 4 represents a nut-lock which is preferably made of thin sheet metal which may be stamped out in the size and shape desired.

1 is an elongated arm extending from the side of the nut-lock having a sharp point and bent over so as to follow the threads of the bolt when the nut-lock is screwed upon the bolt in contact with the holding nut. There may be one or more of these points. When the nut-lock is screwed upon the bolt until it comes in contact with the holding nut the points will be next to the body of the bolt between the threads and may be impinged in the bolt itself by sharp taps of a hammer and become more or less indented in the bolt so as to assist in holding the nut securely at that place and prevent any movement of the nut backward toward the end of the bolt. Also stamped from the sheet metal in making the nut-lock is the tongue 2 formed by the slot or cut 3.

In stamping out the nut-lock and making the cut or slot 3 the inner edge of the circumference of the bolt hole with the tongue 2 is slightly bent in spiral form as shown in Figs. 2, 3 and 4 so as to follow the screw threads of the bolt and thus dispense with any screw threads upon the nut-lock. The said tongue 2 is adapted to follow between the threads and press against the body of the bolt, thus acting somewhat as a pawl in the grooves of the bolt thread to prevent the nut-lock from turning backward. There may be one or more of these tongues as desired and so bent as to fit the sizes of screw threads of the bolt upon which it is designed to be used. The tongues 2 are sprung upwardly for a left hand screw thread and downwardly for a right hand screw thread. The nut-lock may be readily screwed upon the bolt and come in contact with the holding nut upon the bolt, making a very economical and effective way of securing the nut-lock upon the holding bolt and holding the nut upon the bolt. As thus constructed my nut-lock is an improvement of the nut-lock shown and described in the former patents. It is more cheaply made and more effective and satisfactory in use than my former nut-locks. The point 1 following the screw threads and impinging the bolt itself between the threads does not injure the threads of the bolt so that when the nut-lock is removed the holding nut can be taken off and replaced without trouble. The point 2 being constructed at an angle from the body of the nut-lock together with the spiral form of the inner edges of the circumference of the bolt hole acts as a screw thread in the nut-lock when placing the nut-lock upon the bolt and when screwed down close against the holding nut operates to tilt the nut-lock much the same as the lug E in my Patent No. 869,696, above referred to.

The labor of cutting or tapping threads in the nut-lock is avoided by the body of the nut-lock being made from sheet metal in one piece of proper thickness to fit between the threads of the bolt. The inner edge of the circumference of the bolt hole is made with one or more cuts or slots to allow it to be sprung into a spiral or screw-form to fit between the threads of the bolt and cause pressure to bear upon the threads of the bolt by the resiliency of the nut-lock. Thus a cutting edge is formed at the beginning and end of the circle surrounding the bolt hole. This cutting edge will cut into the side of the thread of the bolt and into the bolt itself. The point 2 impinges the body of the bolt back of the center of the bolt and presses against the bolt and is held in this position by the resiliency of the nut-lock as above described and tends to hold the nut-lock from turning backward and thus holds the holding nut in position upon the bolt and makes a very serviceable and useful nut-lock at a very slight expense.

What I claim as my invention and desire to secure by Letters Patent is,

1. A nut-lock consisting of a locking nut stamped from sheet metal, a slot stamped therein forming a tongue at an angle with the body of the locking nut and which with the inner edge of the circumference of the bolt hole is arranged and adapted to follow the screw threads on the bolt and come in contact with the top surface of the holding nut and hold said lock-nut in a tilted position with a spring pressure, and an elongated arm to said locking nut on the side thereof, said elongated arm forming a sharp point.

2. In a nut-lock means for locking the nut by a locking nut formed from thin metal, the inner edge of the circular bolt hole having a slot cut therein, a tongue formed by said slot, said tongue being bent from the plane of the surface of the body of the nut-lock and adapted to follow between the threads and press against the body of the bolt and acting as a pawl and adapted to prevent the locking-nut from turning backward.

3. A nut-lock formed from thin metal, the inner edge of the circumference of the bolt hole having a slot cut therein, the tongue formed by said cut being bent from the plane of the surface of the body of the nut-lock, said inner edge being somewhat spiral in form, forming a tongue at the beginning of the spiral, and adapted to follow the thread of a bolt, and an elongated arm on the outer edge of said nut-lock forming a sharp point adapted to impinge in the body of the bolt between the screw threads, said tongue projecting backward allowing the nut-lock to be turned forward to take up slack space caused by the elongation of the bolt under tension.

4. A nut-lock formed from thin metal, the inner edge of the circular bolt hole having a slot cut therein, the tongue formed by said cut being bent from the plane of the surface of the body of the nut-lock, said inner edge being somewhat spiral in form, forming a cutting edge at the beginning of the spiral and adapted to follow the thread of a bolt, an elongated arm on the outer edge of said nut-lock forming a sharp tongue adapted to impinge in the body of the bolt between the screw threads, said inner edge and tongue formed by said slot constituting a spring and adapted to cause the nut-lock to tilt and bind against the sides of the screw threads and said points to tend to impinge the body of the bolt.

In testimony whereof I affix my signature in presence of two witnesses.

EDWIN A. DOTY.

Witnesses:
WALTER E. WARD,
RETA VAN DER VOLGEN.